United States Patent
Mastie et al.

(10) Patent No.: US 6,515,756 B1
(45) Date of Patent: Feb. 4, 2003

(54) SELECTING PRINT ATTRIBUTE VALUES IN A NETWORK PRINTING SYSTEM

(75) Inventors: Scott David Mastie, Longmont, CO (US); Arthur Ray Roberts, Boulder, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/143,281

(22) Filed: Aug. 26, 1998

(51) Int. Cl.[7] .............................................. G06F 15/00
(52) U.S. Cl. ..................................................... 358/1.15
(58) Field of Search ........................... 358/1.1, 1.5, 1.9, 358/1.13, 1.14, 1.15; 710/52, 40, 61, 5–7, 41, 42, 45; 711/158; 709/200, 201, 202, 203, 213, 220, 226, 248, 301, 400

(56) References Cited

U.S. PATENT DOCUMENTS

| | | | | |
|---|---|---|---|---|
| 5,113,355 A | * | 5/1992 | Nomura | 358/1.9 |
| 5,179,637 A | * | 1/1993 | Nardozzi | 358/1.15 |
| 5,220,674 A | * | 6/1993 | Morgan et al. | 358/800 |
| 5,559,933 A | * | 9/1996 | Boswell | 358/1.15 |
| 5,727,135 A | * | 3/1998 | Webb et al. | 358/1.14 |
| 6,023,727 A | * | 2/2000 | Barrett et al. | 709/221 |
| 6,055,063 A | * | 4/2000 | Yang et al. | 358/1.15 |
| 6,145,031 A | * | 11/2000 | Mastie et al. | 710/52 |

* cited by examiner

*Primary Examiner*—Gabriel Garcia
(74) *Attorney, Agent, or Firm*—David W. Victor; Konrad Raynes Victor & Mann, LLP (57) ABSTRACT

Provided is a system for processing print jobs in which uniformity in print attributes across different servers and physical printers is maintained. One of a plurality of transform process is selected from at least two controllers to process input data files associated with print jobs. The controller including the selected transform process processes at least one configuration file to determine a set of print attribute values and submits the determined set of print attribute values to the selected transform process. The selected transform process processes the input data file in accordance with the submitted set of print attribute values to produce an output data stream. Additional transform processes executed in the controllers are selected. The controllers including the additional transform processing process the configuration file to determine print attribute values and submit the determined set of print attribute values to the additional selected transform processes. The additional transform process processes the input data files in accordance with the submitted set of print attribute values to produce additional output data streams. The output data streams generated from different controllers and transform processes have compatible print attribute values across the selected transform processes and controllers.

26 Claims, 2 Drawing Sheets

FIG. 1

SELECTING PRINT ATTRIBUTE VALUES IN A NETWORK PRINTING SYSTEM

CROSS-REFERENCE TO RELATED APPLICATIONS

This application is related to the following and commonly-assigned patent applications, all of which are filed on the same date herewith, and all of which are incorporated herein by reference in their entirety:

"Load Balancing For Processing A Queue Of Print Jobs," Scott D. Mastie Hongliang Tong, Ming Xie, Christopher B. Hirsch, U.S. patent application Ser. No. 09/140,480, now U.S. Pat. No. 6,373,585;

"Multiple Insertion Point Queue to Order and Select Elements to Be Processed," by Scott D. Mastie and Ming Xie, U.S. patent application Ser. No. 09/140,482, now U.S. Pat. No. 6,145,031; and "Rule Based Selection Criteria For Controlling Print Job Distribution," by Scott D. Mastie and Ming Xie, U.S. patent application Ser. No. 09/140,613.

BACKGROUND OF THE INVENTION

1. Field of the Invention

The present invention relates to a method and system for providing print attribute resources to transform processes and, in particular, providing a common repository for print attribute values to be applied to transform processes executing in multiple controllers in a network printing system.

2. Description of the Related Art

Network printing systems generally comprise an assemblage of different printers, client computers, servers, and other components connected over a network. A print job is assembled at a client computer and transmitted over the network to a server linked to a variety of printers. The printers may have different printing capabilities. Thus, for a given submitted print job, some printers in the network may not be able to process the print job. To route print jobs through a network printing system, International Business Machines Corporation (IBM) provides Printing Systems Manager (PSM ) products that provide centralized and distributed management of a network printing system. The IBM PSM systems manage the flow of print jobs and insure that a print job is routed to a printer that can handle the job.

A print job is comprised of one or more electronically-stored files and the print attributes therefor. The print attributes inform the printer how to process the files. To assemble print jobs, prior art systems include software installed on the client computer that displays a graphical user interface (GUI). Using a mouse, keyboard, etc., the user selects from a menu of options displayed in the GUI the components and print attributes for a print job. The client computer, under control of the installed software, would then create an electronically-stored job ticket based on the information entered by a user. A "user" as that term is used herein refers to a system administrator that configures a network printing system or anyone using the system, such as a person at a client computer creating and submitting print jobs, i.e., an end user.

Job tickets typically only define the print attributes for a single file. However, a document may be comprised of multiple files, each having one or more print attributes. A file submitted to the printer often includes printer instructions in a page description language (PDL) such as POST-SCRIPT™. POSTSCRIPT is a trademark of Adobe Systems, Incorporated. The PostScript language is used by many printers and applications to provide the complex fonts, graphics, and image handling capabilities required by today's applications. The PostScript language must be interpreted by either the printer or a transform process to produce a printed image file that is ready to be printed. Transform processes, such as PS2AFP, TIFF2AFP, etc., are daemons executing in a controller that transform an input data stream, e.g., PostScript, TIFF, etc., into a printer readable output stream. Transformation often involves the transformation of a print file to a bit-mapped image format, also known as a raster image, which is capable of being processed directly by the printer. At some point in the print process, a print file must be converted to a bit map file in the server, printer or other location.

A "print attribute" or "print attribute value" as that term is used herein refers to any type of control factor that is used to affect the print transform process which generates an output data stream that controls the printer. Print attributes include:

Form definitions: Form definitions provide instructions on how printer devices position data on the page. Form definitions can specify overlays, a paper source for cut-sheet printer devices, duplexed printing, text suppression, data position, and the number and modifications of pages;

Page definitions: Page definitions contain the formatting controls for line data. Page definitions can include controls for the number of lines per logical page, font selection, print direction, and the mapping of individual fields to positions on the logical page;

Page segments: Page segments contain text and images that you can include at any addressable point on a page or an electronic overlay;

Overlays: Overlays are collections of predefined data such as lines, shading, text boxes, or logos, that can merge with variable data on a page or a form during printing; and Fonts: A font is a single size and typeface in a particular type family, including letters, numerals, punctuation marks, special characters, and ligatures.

In distributed printing environments having multiple printers, a print job is directed toward a logical printer which associates a printer/server/controller with the print job. A user may then assign default job or document print attributes. The default job print attributes apply to all jobs submitted to the server, i.e., logical printer. The default document print attributes provide print attributes for a particular document. However, with present systems for selecting print attribute values, results of processed print jobs may vary, thereby providing inconsistent printing results.

SUMMARY OF THE PREFERRED EMBODIMENTS

To overcome the limitations in the prior art described above, the preferred embodiments disclose a method and system for processing print jobs, while guaranteeing uniformity in print attributes across different servers and physical printers. One of a plurality of transform processes is selected from at least two controllers to process input data files associated with print jobs. The controller including the selected transform process processes at least one configuration file to determine a set of print attribute values and submits the determined set of print attribute values to the selected transform process. The selected transform process processes the input data file in accordance with the submitted set of print attribute values to produce an output data stream. Additional transform processes executed in the controllers are selected. The controllers including the additional transform processes process the configuration file to determine print attribute values and submit the determined set of print attribute values to the additional selected transform processes. The additional transform processes process the input data files in accordance with the submitted set of print attribute values to produce additional output data streams. The output data streams generated from different controllers and transform processes have compatible print attribute values across the selected transform processes and controllers.

In further embodiments, print attribute values may be provided for the specific print job and the controllers. In yet further embodiments, print attribute values may be determined hierarchically, with certain print attribute values overriding other provided print attribute values.

With current systems for selecting print attribute values, the different printers/controllers/servers in the network printing system may have different configuration files defining print attribute values. This variance in configuration files used by printers/servers/controllers may result in output streams having different print attributes because different printers/server/controllers may use different files of print attribute values to process a print job. For instance, different printers may load different fonts to process the same job. Accordingly, the results of processed print jobs may vary in a network printing system depending upon which controller receives the print job and the default print attributes for that controller. Compounding this, a job itself can alter the printer environment. The print job may load print attributes into the printer. For these reasons, consistency in generating output data streams across controllers cannot be insured.

Preferred embodiments provide a method and system for providing a set of consistent print attribute values across multiple controllers and servers executing transform processes. In this way, transform processes executing in different controllers may receive the same print attributes from a common configuration file, thereby producing output data streams having consistent print attribute values. Such a system normalizes printing environments across servers, printer controllers, and printers to insure printing consistency.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural changes may be made without departing from the scope of the present invention.

Hardware and Software Environment

Figure 1:
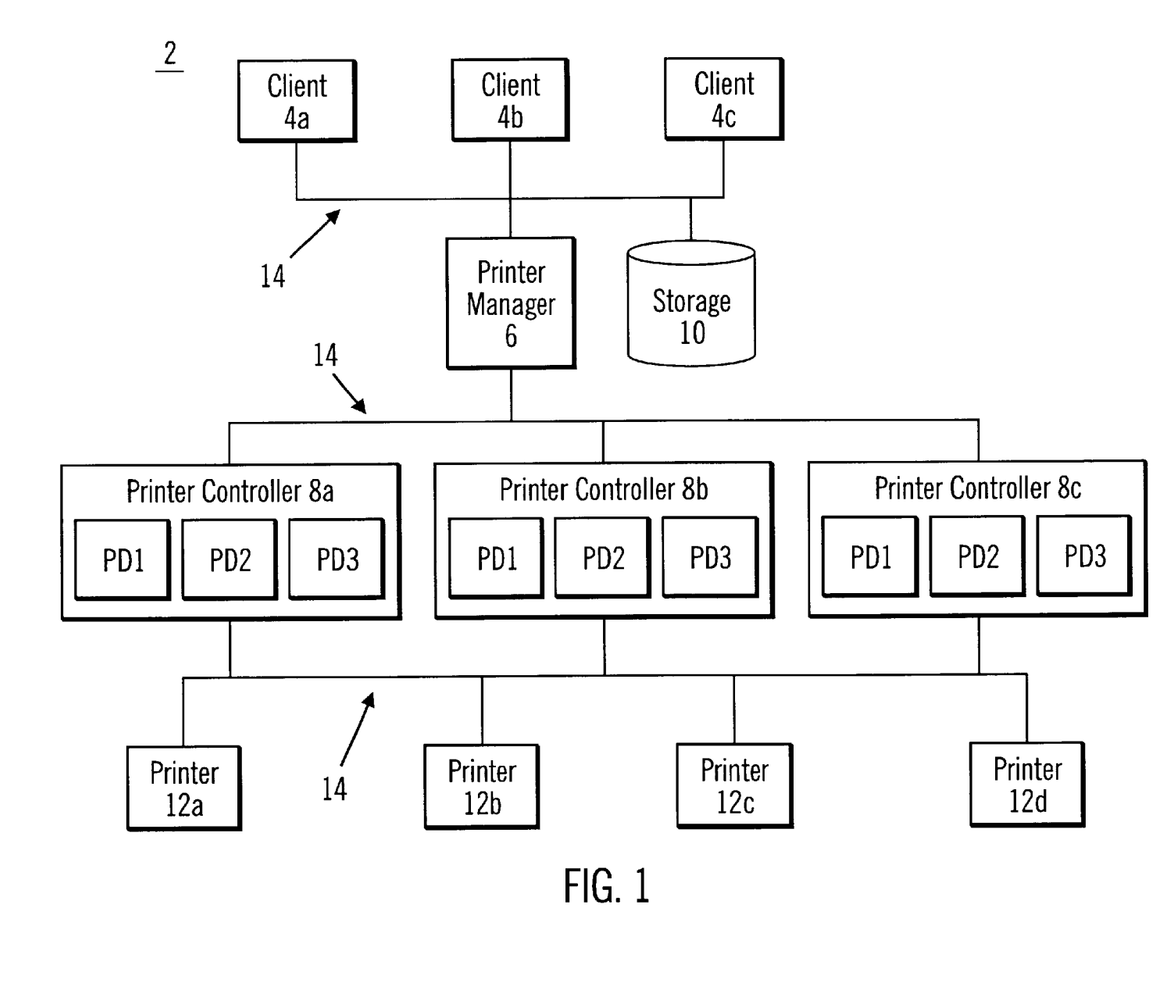
FIG. 1 is a block diagram illustrating a software and hardware environment in which preferred embodiments of the present invention are implemented.

FIG. 1 illustrates a preferred hardware and software environment in which preferred embodiments of the present invention are implemented. A network printing system 2 is comprised of a plurality of client computers 4a, b, c connected to a printer manager 6, which routes print jobs received from the clients 4a, b, c to one of a plurality of printer controllers 8a, b, c. The clients 4a, b, c and the printer manager 6 may access a storage device 10 which may store various printer related files, including files containing print attribute values. The printer controllers 8a, b, c are each capable of executing multiple instances of printer daemons PD1, PD2, PD3. Each printer daemon (PD) can transform an input data file to a format that may be processed by the printer. For instance, if the print job was a PostScript file, then the printer daemon (PD) would transform the PostScript file to a raster image process (RIP) file. The IBM PS2AFP daemon program performs such a transformation. The printer daemons (PD) executing in multiple printer controllers 8a, b, c may be capable of simultaneously transforming different types of input data streams, e.g., PostScript, ditroff, PCL™, TeX, etc. PCL is a trademark of the Hewlett-Packard Company. The printer daemons in the controllers 8a, b, c then transfer the processed data file to one of several printers 12a, b, c, d through a backend program that selects the printer. The printers 12a, b, c, d may be any suitable printer machine known in the art, such as the IBM INFOPRINT™ series of printers. INFOPRINT is a trademark of IBM.

A network system 14 provides communication among the clients 4a, b, c, the printer manager 6, the storage device 10, the printer controllers 8a, b, c, and the printers 12a, b, c, d. The network 14 may be comprised of any suitable network architecture known in the art, such as LAN, Ethernet, WAN, System Area Network (SAN), Token Ring, LocalTalk, TCP/IP, the Internet, etc. Alternatively, there may be separate and different networks between the clients 4a, b, c, and the printer manager 6, and the printer controllers 8a, b, c and the printers 12a, b, c, d. In preferred embodiments, the network printing system 2 employs a distributed file system (DFS), which allows storage and retrieval of data throughout the network printing system 2.

The printer manager 6 may be a separate stand alone server including an operating system such as AIX®, OS/390™, UNIX®, OS/2®, MVS™, WINDOWS®, etc. AIX and OS/2 are registered trademarks of IBM and OS/390 and MVS are trademarks of IBM; WINDOWS is a registered trademark of Microsoft Corporation; UNIX is a registered trademark licensed by the X/Open Company LTD. The clients 4a, b, c may be any computer system known in the art including software to submit print jobs to the printer manager 6. The storage device 10 may be any suitable non-volatile storage device, such as a direct access storage device (DASD), automated tape library (ATL), holographic units, etc., capable of storing print files. The clients 4a, b, c may build print jobs that include print files, such as PostScript files, maintained in the storage device 10. The printer controllers 8a, b, c may be printer controllers capable of executing multiple instances of printer daemons, such as the IBM Multiple Printer Controllers (MPC) software that runs on the IBM RS/60000® server under the AIX operating system. RS/6000 is a registered trademark of IBM. The MPC software dedicates a portion of the server processor cycles to each instance of a printer daemon that transforms data to a print image.

A RIP is often considered as the transform process of a PostScript file to a bit map file. The term RIP is used herein interchangeably with transform process and printer daemon (PD) to refer to any type of transform process regardless of the format of the file being transformed to a printer readable format, i.e., bitmap file. The terms RIP, RIPper, RIPped, and RIPping all refer to a particular stage or instance of a RIP transform process. As used herein the term "print job" refers to a print job that needs to be RIPped or otherwise transformed. The concurrent execution of multiple print daemons is embodied in current IBM MPC and IBM PSF/6000 software products, described in IBM publications "PSF/6000: Print Submission," document no. S544-3878-01 (Copyright IBM Corp. 1993, 1994); "PSF/6000: Print Administration," document no. S544-3817-01 (Copyright IBM Corp. 1993, 1994); "IBM Print OnDemand User Guide," document no. G544-5325-00, (Copyright IBM Corp. 1996), all of which IBM publications are incorporated herein by reference in their entirety. The printer manager 6 and printer controllers 8a, b, c would include further logic to implement the preferred embodiments of the present invention.

Each of the devices in the network 2 has a unique IP address. Moreover, each printer daemon (PD) in the printer controllers 8a, b, c may be associated with a port address. The combination of the IP address of the printer controller 8a, b, c and the port address therein provides a unique address for the printer daemon (PD). The printer manager 6 may use this unique printer daemon (PD) address to route a print job to a specific instance of one of many printer daemons executing in the printer controllers 8a, b, c.

Thus, the preferred embodiments may be implemented as a method, apparatus or article of manufacture using standard programming and/or engineering techniques to produce software, firmware, hardware, or any combination thereof The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

Setting Printing Resources Across Printer Controllers

In preferred embodiments, the configuration files including predefined print attributes may be installed at locations in the network 2, e.g., storage 10. In preferred embodiments, a configuration file may define print attribute values for specific printers, print job, printer controllers 8a, b, c, and printer daemon (PD) types regardless of the printer controller 8a, b, c in which the printer daemon is executing. When the printer manager 6 receives a print job, the printer manager 6 determines the type of printer daemon to use, e.g., PS2AFP, D2AFP, TIFF2AFO, etc., based on the type of input data file, e.g., PostScript, ditoff, TIFF, etc. After determining the type of printer daemon (PD), the printer manager 6 would then select a printer daemon (PD) available in one of the controllers 8a, b, c. Related patent application Ser. No. 09/140,480, entitled "Load Balancing For Processing A Queue Of Print Jobs, by S. Mastie," H. Tong, M. Xie, C. Hirsch, which application was incorporated herein by reference above and which is assigned to IBM, the assignee of the present application, describes methods for selecting an available printer daemon (PD).

After selecting a printer daemon type and particular printer daemon from one of the printer controllers 8a, b, c, the printer manager 6 would then determine print attribute values by examining configuration files in the network 2. The printer manager 6 would then invoke the selected printer daemon (PD) and transmit the determined print attribute values to the invoked printer daemon (PD). The printer daemon (PD) would then generate the output data stream in accordance with the print attribute values submitted by the printer manager 6.

As discussed, files of print attribute values are available at different levels in the printing system 2, e.g., print job level, user level, printer controller level, transform process level. The print job print attributes may be included in the file(s) submitted with the printjob. Alternatively, the printjob may reference print attributes stored in a network directory. Print attributes at the user level, printer controller level, and transform process level may be maintained in configuration files in directories in the network 2. For instance, a directory may include predefined print attributes for a printer daemon (PD) type, regardless of which printer controller 8a, b, c the daemon was executing within, i.e., a global configuration file. Use of the print attributes in this global configuration file would insure constant print attribute value settings across printer controllers 8a, b, c, thus providing consistent printing output across printer controllers 8a, b, c. For instance, a directory may include the global configuration files and each subdirectory therein would include the specific global configuration file for each particular printer daemon (transform process) type, e.g., PS2AFP, TIFF2AFP, etc. For instance, the subdirectory "/usr/lpp/psf/ps" could contain fonts for the transform process transforming PostScript input data streams, e.g., PS2AFP. The user may specify and modify a font mapping file in the fonts directory which includes font mappings for all printer daemons for a transform process type. Once the user modifies the global configuration file, the user creates a global custom configuration file including user defined print attribute values that apply to the printer daemon (PD) type regardless of which printer controller 8a, b, c the daemon is executing within.

Table 1 below illustrates a preferred embodiment of the keyword fields in the global configuration file for the PostScript daemon referred to as PS2AFP.

TABLE 1

| KEYWORD | VALUES | PURPOSE |
| --- | --- | --- |
| port | 8251 | which TCP/IP port to use |
| work_directory | /var/psf/ps2afp | directory to put work files into |
| log_file | /var/psf/ps2afp/ps2afpd.log | where to write log messages |
| notify | root | who to notify if problems encountered |
| mail_command | /usr/bin/mail | program used to send notifications |
| ps_program | /usr/lpp/psf/bin/ppxps2i | name of PostScript interpreter program |
| ps_init_file | /usr/lpp/psf/ps2afp/ppxps2.ps | name of PostScript interpreter initialization file |
| ps_max_memory | 6000K | maximum amount of memory that PostScript uses |
| ps_job_timeout | 20 | maximum number of minutes to process PostScript job |
| ps_server_timeout | 20 | maximum number of minutes server waits between jobs |

TABLE 1-continued

| KEYWORD | VALUES | PURPOSE |
| --- | --- | --- |
| ps_font_map_files | /usr/lpp/psf/ps/psfonts.map | list of font-mapping files |
| ps_width | 7.78i | width of generated image |
| ps_length | 10.28i | length of generated image |
| ps_x_offset | 0i | left and right margins |
| ps_y_offset | 0i | top and bottom margins |
| ps_resolution | 600 | resolution of target printer |
| ps_output_type | IO1_G4 | type of AFP image to generate |

The port name field indicates the TCP/IP port on which the PostScript daemon listens within a printer controller 8a, b, c. In alternative embodiments, there may be multiple ports on which the daemon could listen. The log_file field indicates the file in which the transform daemon logs errors and messages when converting the input data stream to an output stream, such as a RIP file. The ps_font_map_files field specifies the path and file name the printer daemon uses for the font-mapping operations. This file maps outline font names to the file names containing the fonts. In TABLE 1, the font map file for the PostScript daemon (PS2AFP) is maintained at the subdirectory "/usr/lpp/psf/ps/." Other of the print attribute fields are described in the purpose column of TABLE 1.

The unmodified configuration file is the global default configuration file accessed by all printer daemons of a particular type. The user may modify the values in the configuration file. In such case, all printer daemons of a particular type, e.g., PS2AFP, D2AFP, etc., in all printer controllers 8a, b, c would use the customized global configuration. There may also be a configuration file for a transform process command selectively executed by the user. The transform command configuration file would further specify the IP address of a printer controller on which to execute the command.

The printer manager 6 would process the configuration file when submitting a print job to a particular printer daemon (PD) in a printer controller 8a, b, c if no other lower level print attribute information was provided. In further embodiments, the user may define resource-context objects to identify the directory path and location for different print attribute definitions. The user may then associate a particular server or a particular print job with a resource context object which points to a directory in the network printing system 2 containing a configuration file of print attribute values. If the user wants to change the location of a particular resource defining print attributes, the user need only modify the path name specified in the resource-context object. The resource-context object is a program object which identifies a print job, printer or controller with a set of attributes located in directories throughout the network 2.

The above configuration table in TABLE 1 may be a global configuration table accessed by all printer daemons (PD) on all the printer controllers 8a, b, c. If the user modifies the configuration table, then such modified table is a global custom configuration file. The default global configuration file would also remain. The printer manager 6 accesses various directory locations including files having print attribute values, including the location of the global custom configuration file, to obtain print attribute values.

The printer manager 6 then transfers the accessed print attribute values to the printer controller 8a, b, c and transform process (PD) executing therein, e.g., PS2AFP. The printer daemon (PD) processes the input data stream in accordance with the print attribute values provided by the printer manager 6 to produce the output data stream.

Selecting Print Attributes

Figure 2:
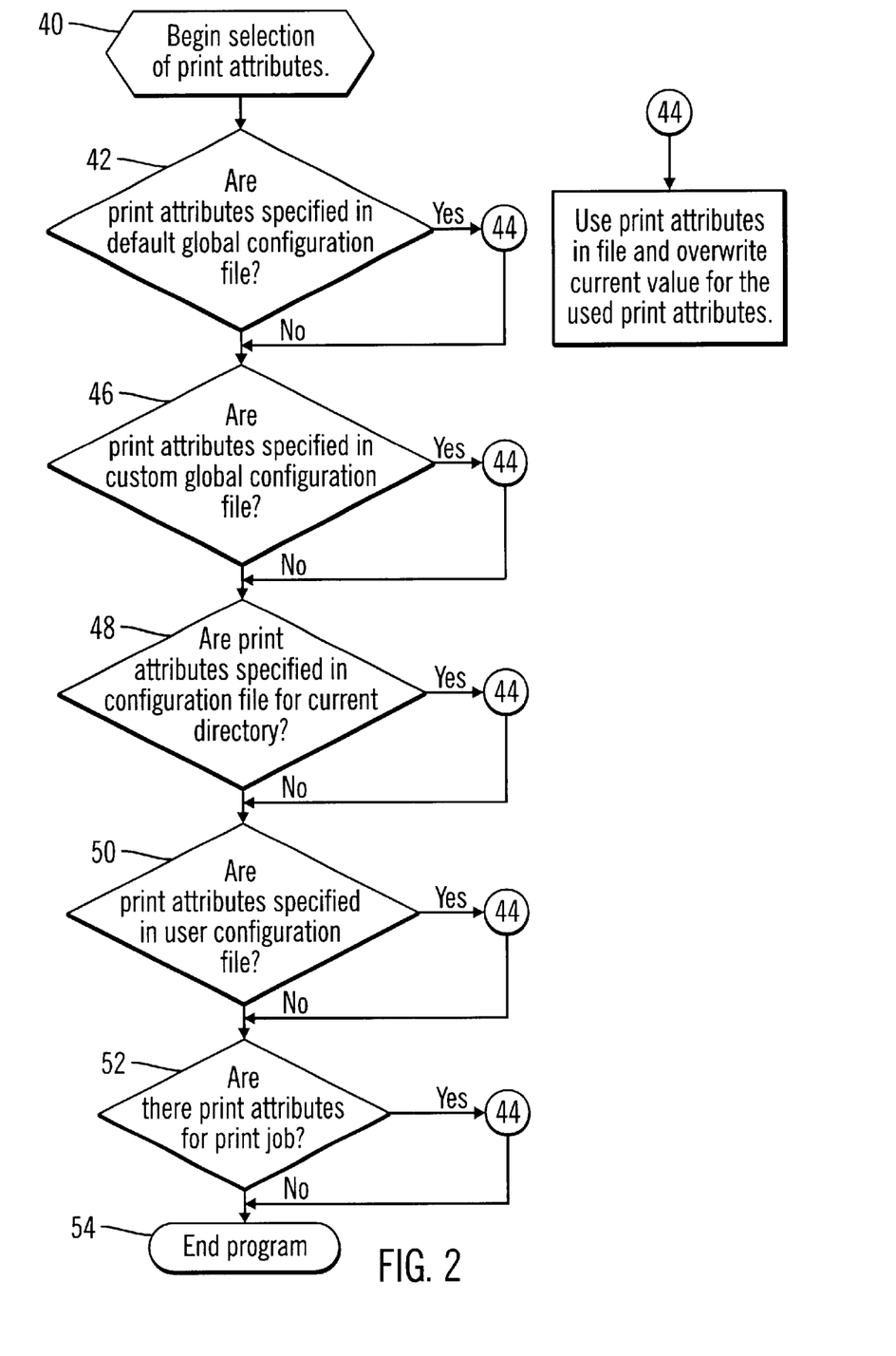
FIG. 2 is a flowchart showing logic for determining print attribute values in accordance with preferred embodiments of the present invention.

In preferred embodiments, the printer manager 6 searches different directory locations in the network 2 in a predefined order to determine which print attribute values to use. Print attribute values may be defined at different levels. As discussed, a configuration file may be maintained for a printer daemon type which applies across printer controllers 8a, b, c; a printer type; a specific printer controller 8a, b, c or a particular print job, etc. FIG. 2 illustrates logic implemented in the printer manager 6 to select print attributes in a hierarchical order. Control begins at block 40 which represents the printer manager 6 proceeding to determine the print attributes to use for the printer daemon (PD) that is selected for the input data file. For instance, if the input data file is in PostScript, then the printer manager 6 would look in directories associated with the PostScript daemon PS2AFP to locate print attribute values; if the input data file is in ditoff, then the printer manager 6 would look in directories associated with the D2AFP daemon to select print attributes when generating the output data stream, etc.

Control transfers to block 42 which represents the printer manager 6 determining whether a default global configuration file includes any print attribute values. If so, control transfers to block 44 to use the print attributes in the file and overwrite any of the current settings for print attribute values determined from the file, if there are such current settings. The current settings of print attribute values that are not defined in the configuration file are not effected when using the print attribute values from the file. Control then transfers to block 46 which represents the printer manager 6 determining whether there are any print attribute values specified in a custom global configuration file. The custom global configuration file provides print attributes for a particular printer daemon (PD) type irregardless of the printer controller 8a, b, c where the printer daemon (PD) is executing. If so, control transfers to block 44 to use those print attribute values, overwriting the current values for those print attribute values used from the custom global configuration file. Control then transfers to block 48 which represents the printer manager 6 determining whether any print attribute values are specified in the configuration file for the current directory of the printer controller 8a, b, c in which the printer daemon (PD) is executing. Such print attributes are the default values for the particular printer controller 8a, b, c. If there are print attribute values specified in the current directory configuration file, then control transfers to block 44 to use those print attribute values, overwriting the current values for those print attribute values used from the current directory configuration file.

Control transfers to block 50 which represents the printer manager 6 determining whether there are print attributes in the user configuration file. If so, control transfers to block 44 to use those print attribute values, overwriting the current values for those print attribute values used from the user configuration file. Finally control transfers to block 52 which represents the printer manager 6 determining whether there are print attributes for the print job. Such print job specific print attributes may be referenced in a configuration file in the network 2 or included with, the submitted printjob. If there are print attributes for the printjob, then control transfers to block 44 to use those print attribute values, overwriting the current values for those print attribute values used from the print job settings. Control then transfers to block 54 to end the program. After determining print attribute values in accordance with the logic of FIG. 2, the printer manager 6 would submit the determined print attribute values to the selected printer daemon (PD). The printer daemon (PD) would then transform the input data file to an output data stream according to the print attribute values provided by the printer manager 6.

With the logic of FIG. 2, the printer manager 6 searches for print attribute values in a hierarchical order that places precedence on user specified values set at the lowest possible level, from default global values, to custom global values, to server/controller specific values, to user specific, and finally to print attributes set for the print job. The global configuration files, both custom and default, provide print attributes for all printer daemons in all controllers 8a, b, c. In this way, by using the global configuration files, any printer daemon (PD) on any printer controller 8a, b, c would use the same print attribute files, thereby assuring consistent print job processing across printer controllers 8a, b, c. The different files, e.g., default global, custom global, current directory, etc., may include some or all of the print attributes described in Table 1 or any other print attributes known in the art. For instance, as the print attributes are refined through applying different configuration files, fewer print attributes may be altered.

Moreover, with the preferred embodiments, the user need only make a change in the global default configuration file, creating a global custom configuration file, that automatically applies to all printer daemons (PD) of the type specified for the configuration file throughout all controllers 8a, b, c. In this way, print attributes, such as fonts, can be normalized across all controllers 8a, b, c and attached printers 12a, b, c, d in the system 2.

In preferred embodiments, the printer manager may look in specific paths and subdirectories specified for the different levels of print attributes. In such case, if the user alters the location of a print attribute, the user must alter the reference to that location wherever such reference was made, e.g., at the file level, controller, etc. If resource-context objects are used to relate print attribute values to a level, then to change the location of print attribute values in the network 2, the reference to the directory and path need only be changed in the resource-context object, not at the devices where such reference is made.

ALTERNATIVE EMBODIMENTS AND CONCLUSION

This concludes the description of the preferred embodiments of the invention. The following describes some alternative embodiments for accomplishing the present invention.

The preferred embodiments were described as normalizing print attributes across printer controllers (e.g., MPCs), servers, printers, etc. In alternative embodiments, the preferred embodiments could normalize print attributes when there are no servers or controllers, such as the case when multiple printers, such as smart printers, are accessed directly via a network.

In many instances, the RIP process or print daemon was described as the PS2AFP daemon that transforms a PostScript file to a RIPed file. However, the above embodiments can apply to any type of transform process that receives an input data file and converts the data to an output print file that is printer ready, e.g., a RIP file. The print daemons may be any type of process to transform data files to print files, regardless of the underlying operating systems, and can cover any type of process including transform processes that handle RIP, ASCII data, ditroff data, IPDS data, line data, MO:DCA-P data, OS/2 metafile format data, SCS data, etc.

The fields and print attribute values included in the configuration file may differ from the arrangement of fields discussed with respect to the preferred embodiment of Table 1. The configuration file may be comprised of multiple files or a single file. The configuration files may be maintained within a storage area within the printer manager 6 or in a storage area elsewhere within the network printing system 2, such as the storage 10.

The printer manager 6 and printer controllers 8a, b, c are described as implemented in separate server machines networked together. In alternative embodiments, functions performed by the printer manager 6 may be implemented within one or more printer controllers 8a, b, c. Moreover, each printer controller 8a, b, c, may be capable of implementing more or less print daemons than the three print daemons illustrated in the preferred embodiment. In yet further embodiments, the printer manager and printer controllers 8a, b, c may be implemented as software programs within a single server.

The logic of FIG. 2 is for illustrative purposes. Additional or alternative steps may be performed in addition to those illustrated in the logic. Further, the order of the steps in the preferred logic may also vary. The logic of FIG. 2 may be implemented as a software application program within the printer manager 6 or other systems in the network 2, or as software included in the operating system, or as hardwired control in a memory device, such as a ROM.

In summary, preferred embodiments in accordance with the present invention provide a method and system for processing print jobs, while guaranteeing uniformity in print attributes across different servers and physical printers. One of a plurality of transform process is selected from at least two controllers to process input data files associated with print jobs. The controller including the selected transform process processes at least one configuration file to determine a set of print attribute values and submits the determined set of print attribute values to the selected transform process. The selected transform process processes the input data file in accordance with the submitted set of print attribute values to produce an output data stream. Additional transform processes executed in the controllers are selected. The controllers including the additional transform processes process the configuration file to determine print attribute values and submit the determined set of print attribute values to the additional selected transform processes. The additional transform processes process the input data files in accordance with the submitted set of print attribute values to produce additional output data streams. The output data streams generated it from different controllers and transform processes have compatible print attribute values across the selected transform processes and controllers.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing print jobs, comprising the steps of:

processing input data files associated with print jobs;

selecting one of a plurality of transform processes from at least two controllers;

processing at least one configuration file to determine a set of print attribute values;

submitting the determined set of print attribute values to the selected transform process;

processing, with the selected transform process, at least one of the input data files in accordance with the submitted set of print attribute values to produce an output data stream;

selecting additional transform processes executed in the controllers, processing the configuration file to determine print attribute values, and submitting the determined set of print attribute values to the additional selected transform processes; and processing the input data files with the additional transform processes in accordance with the submitted set of print attribute values to produce output data streams, wherein output data streams generated from different controllers and transform processes have consistent print attribute values provided from the at least one configuration file across the selected transform processes and controllers.

2. The method of claim 1, wherein the controllers are separate servers, each having multiple attached printers, wherein output data streams generated from the set of print attribute values have compatible print attribute values provided from the configuration files across the controllers including the transform processes that generated the output data stream.

3. The method of claim 1, wherein the controllers are controllers within multiple printers, wherein output data streams generated from the set of print attribute values have compatible print attribute values provided from the configuration file across printers.

4. The method of claim 1, wherein the print attribute values are comprised of at least one print attribute value that is a member of the set of print attribute values comprising form definitions, font, page definitions, page segments, overlays, fonts, page compression, and screen resolution.

5. The method of claim 1, wherein the configuration file is a transform configuration file providing print attributes for a type of transform process, wherein the step of processing the configuration file to determine the print attribute values comprises the steps of:

applying print attribute values included in the transform configuration file;

determining print attribute values included in a controller configuration file; and determining print attribute values provided for the print job, wherein subsequently determined print attribute values override previously determined print attribute values used to determine the print attribute values for the print job.

6. The method of claim 1, wherein the transform processes are capable of processing a file type that is a member of the set of file types comprising RIP, ASCII data, ditroff data, TIFF, JPEG, GIFF, IPDS data, line data, MO:DCA-P data, OS/2 metafile format data, and SCS data.

7. The system of claim 1, wherein the transform processes are capable of processing a file type that is a member of the set of file types comprising RIP, ASCII data, ditroff data, TIFF, JPEG, GIFF, IPDS data, line data, MO:DCA-P data, OS/2 metafile format data, and SCS data.

8. A method for processing print jobs, comprising:

processing input data files associated with print jobs;

selecting one of a plurality of transform processes from at least two controllers;

processing at least one configuration file to determine a set of print attribute values, wherein the print attribute values are maintained in configuration files, and wherein an object identifies a location of print jobs, controllers, and configuration files;

submitting the determined set of print attribute values to the selected transform process;

processing, with the selected transform process, at least one of the input data files in accordance with the submitted set of print attribute values to produce an output data stream;

selecting additional transform processes executed in the controllers, processing the configuration file to determine print attribute values, and submitting the determined set of print attribute values to the additional selected transform processes;

processing the input data files with the additional transform processes in accordance with the submitted set of print attribute values to produce output data streams, wherein output data streams generated from different controllers and transform processes have consistent print attribute values provided from the at least one configuration file across the selected transform processes and controllers;

modifying a location of at least one of the configuration files to a new location; and indicating in the object the new location, wherein the step of processing the configuration file further comprises determining the location of the configuration file from the object.

9. A system for processing print jobs, comprising:

a plurality of controllers including transform processes capable of executing therein;

a memory area storing at least one configuration file including print attribute values;

program logic executed in the controllers, including:
   (i) means for processing input data files associated with print jobs;
   (ii) means for selecting a transform process from one of the controllers;
   (iii) means for processing at least one configuration file to determine a set of print attribute values;
   (iv) means for submitting the determined set of print attribute values to the selected transform process; and
   (v) means for processing, with the selected transform process, the input data file in accordance with the submitted set of print attribute values to produce an output data stream, wherein output data streams generated from different controllers and transform processes have consistent print attribute values provided from the at least one configuration file across the selected transform processes and controllers.

10. The system of claim 9, wherein the controllers are separate servers, further comprising at least one printer linked to each server, wherein output data streams generated from different controllers have consistent print attribute values provided from the configuration file.

11. The system of claim 9, wherein the controllers are controllers within multiple printers, wherein output data streams generated from the set of print attribute values have consistent print attributes provided from the configuration file across printers.

12. The system of claim 9, wherein the print attribute values are comprised of at least one print attribute value that is a member of the set of print attribute values comprising form definitions, font, page definitions, page segments, overlays, fonts, page compression, and screen resolution.

13. The system of claim 10, wherein the configuration file is a transform configuration file providing print attributes for a type of transform process, wherein the program logic further comprises:

means for applying print attribute values included in the transform configuration file;

means for determining print attribute values included in a controller configuration file; and means for determining print attribute values provided for the print job, wherein subsequently determined print attribute values override previously determined print attribute values used to determine the print attribute values for the print job.

14. An article of manufacture for use in processing print jobs, wherein the print jobs are processed by transform processes that execute in controllers, the article of manufacture comprising computer readable storage media including at least one computer program embedded therein that causes a server to perform:

processing input data files associated with print jobs;

selecting one of a plurality of transform processes from at least two controllers;

processing at least one configuration file to determine a set of print attribute values;

submitting the determined set of print attribute values to the selected transform process;

processing, with the selected transform process, the input data file in accordance with the submitted set of print attribute values to produce an output data stream;

selecting additional transform processes executed in the controllers, processing the configuration file to determine print attribute values, and submitting the determined set of print attribute values to the additional selected transform processes; and processing input data files with the additional transform processes in accordance with the submitted set of print attribute values to produce output data streams, wherein output data streams generated from different controllers and transform processes have compatible print attribute values provided from the at least one configuration file across the selected transform processes and controllers.

15. The article of manufacture of claim 14, wherein the controllers are separate servers, each having multiple attached printers, wherein output data streams generated from the set of print attribute values have compatible print attribute values provided from the configuration files across the controllers including the transform processes that generated the output data stream.

16. The article of manufacture of claim 14, wherein the controllers are controllers within multiple printers, wherein output data streams generated from the set of print attribute values have compatible print attribute values provided from the configuration file across printers.

17. The article of manufacture of claim 14, wherein the print attribute values are comprised of at least one print attribute value that is a member of the set of print attribute values comprising form definitions, font, page definitions, page segments, overlays, fonts, page compression, and screen resolution.

18. The article of manufacture of claim 14, wherein the configuration file is a transform configuration file providing print attributes for a type of transform process, wherein the step of processing the configuration file to determine the print attribute values comprises the steps of:

applying print attribute values included in the transform configuration file;

determining print attribute values included in a controller configuration file; and determining print attribute values provided for the print job, wherein subsequently determined print attribute values override previously determined print attribute values used to determine the print attribute values for the print job.

19. The article of manufacture of claim 14, wherein the transform processes are capable of processing a file type that is a member of the set of file types comprising RIP, ASCII data, ditroff data, TIFF, JPEG, GIFF, IPDS data, line data, MO:DCA-P data, OS/2 metafile format data, and SCS data.

20. An article of manufacture for use in processing print jobs, wherein the print jobs are processed by transform processes that execute in controllers, the article of manufacture comprising computer readable storage media including at least one computer program embedded therein that causes a server to perform:

processing input data files associated with print jobs;

selecting one of a plurality of transform processes from at least two controllers;

processing at least one configuration file to determine a set of print attribute values, wherein the print attribute values are maintained in configuration files, and wherein an object identifies a location of print jobs, controllers, and configuration files;

submitting the determined set of print attribute values to the selected transform process;

processing, with the selected transform process, the input data file in accordance with the submitted set of print attribute values to produce an output data stream;

selecting additional transform processes executed in the controllers, processing the configuration file to determine print attribute values, and submitting the determined set of print attribute values to the additional selected transform processes;

processing input data files with the additional transform processes in accordance with the submitted set of print attribute values to produce output data streams, wherein output data streams generated from different controllers and transform processes have compatible print attribute values provided from the at least one configuration file across the selected transform processes and controllers;

modifying a location of at least one of the configuration files to a new location; and indicating in the object the new location, wherein the step of processing the configuration file further comprises determining the location of the configuration file from the object.

21. A memory storage area including:

at least one configuration file including print attribute values accessible to a plurality of controllers, wherein the controllers process input data files associated with print jobs and at least one configuration file to determine a set of print attribute values, wherein the controllers submit the determined set of print attribute values to selected transform processes, wherein the selected transform processes process the input data files in accordance with the submitted set of print attribute values to produce output data streams, and wherein output data streams generated from different input files by different controllers and transform processes have compatible print attribute values provided from the at least one configuration file; and an object accessible to the controllers, wherein the object identifies a location of print jobs, controllers, and configuration files, wherein print job print attribute values are maintained in configuration files, wherein a location of at least one of the configuration file is modified to a new location that is indicated in the object, and wherein the controllers determine the location of the configuration file from the object.

22. The memory storage area of claim 21, wherein the controllers are separate servers, each having multiple attached printers, wherein output data streams generated from the set of print attribute values have compatible print attribute values provided from the configuration files across servers.

23. The memory storage area of claim 21, wherein the controllers are controllers within multiple printers, wherein output data streams generated from the set of print attribute values have compatible print attribute values provided from the configuration file across printers.

24. The memory storage area of claim 21, wherein the configuration file is a transform configuration file providing print attributes for a type of transform process, wherein controllers process the at least one configuration file to determine the print attribute values by applying print attribute values included in the transform configuration file, determining print attribute values included in a controller configuration file, wherein subsequently determined print attribute values override previously determined print attribute values used to determine the print attribute values for the print job.

25. The memory storage area of claim 21, wherein the memory storage area is comprised of multiple memory storage areas distributed throughout a network.

26. A system for processing print jobs, comprising:

a plurality of controllers including transform processes capable of executing therein;

a memory area storing at least one configuration file including print attribute values;

program logic executed in the controllers, including:
(i) means for processing input data files associated with print jobs;
(ii) means for selecting a transform process from one of the controllers;
(iii) means for processing at least one configuration file to determine a set of print attribute values, wherein the print attribute values are maintained in configuration files, and wherein an object identifies a location of print jobs, controllers, and configuration files;
(iv) means for submitting the determined set of print attribute values to the selected transform process;
(v) means for processing, with the selected transform process, the input data file in accordance with the submitted set of print attribute values to produce an output data stream, wherein output data streams generated from different controllers and transform processes have consistent print attribute values provided from the at least one configuration file across the selected transform processes and controllers;
(vi) modifying a location of at least one of the configuration files to a new location; and
(vii) indicating in the object the new location, wherein the step of processing the configuration file further comprises determining the location of the configuration file from the object.

\* \* \* \* \*